United States Patent
Cullen

(10) Patent No.: US 6,605,798 B1
(45) Date of Patent: Aug. 12, 2003

(54) CUTTING OF ULTRA-HARD MATERIALS

(76) Inventor: Barry James Cullen, 75 The Paddocks, Westbury, Corbally, Limerick (IE)

( * ) Notice: Subject to any disclaimer, the term of this patent is extended or adjusted under 35 U.S.C. 154(b) by 0 days.

(21) Appl. No.: 09/868,886

(22) PCT Filed: Dec. 21, 1999

(86) PCT No.: PCT/IB99/02032

§ 371 (c)(1),
(2), (4) Date: Nov. 12, 2001

(87) PCT Pub. No.: WO00/37208

PCT Pub. Date: Jun. 29, 2000

(30) Foreign Application Priority Data

Dec. 22, 1998 (ZA) .............................. 98/11764

(51) Int. Cl.⁷ .............................. B23K 26/38
(52) U.S. Cl. .............................. 219/121.72
(58) Field of Search ........... 219/121.6, 121.67, 219/121.68, 121.69, 121.7, 121.71, 121.72, 121.85, 1

(56) References Cited

U.S. PATENT DOCUMENTS 5,366,522 A  *  11/1994  Nakamura et al.

FOREIGN PATENT DOCUMENTS

| EP | 0 567 129 A2 | 10/1993 |
|---|---|---|
| JP | 63206386 | 8/1988 |
| JP | 04340282 | 11/1992 |

OTHER PUBLICATIONS

International Search Report prepared in connection with PCT/IB99/02032 by the ISA/EP (3 pages).

* cited by examiner

Primary Examiner—Samuel M. Heinrich
(74) Attorney, Agent, or Firm—Jenkens & Gilchrist, P.C.

(57) ABSTRACT

The invention provides the use of a slab laser beam for the cutting of an ultra-hard material such as PCD or PCBN.

11 Claims, No Drawings

CUTTING OF ULTRA-HARD MATERIALS

BACKGROUND OF THE INVENTION

This invention relates to the cutting of ultra-hard materials.

Ultra-hard materials are those which themselves have a high hardness, e.g. particles which have a hardness of about 10 or more on the MOHS hardness scale, or materials which contain such particles and have a similar hardness. Particular examples are natural or synthetic diamond and cubic boron nitride, or polycrystalline diamond (PCD) or polycrystalline cubic boron nitride (PCBN).

Ultra-hard materials, particularly those of synthetic nature, can be produced in relatively large sizes and need to be cut for various applications. For example, PCD can be produced in the form of a large disc and this disc needs to be cut into smaller pieces, such pieces having application, for example, as drill or cutting inserts. Further, diamond plates produced by chemical vapour deposition (CVD) are cut into smaller pieces for use as heat sinks for semiconductor devices or in mechanical applications.

Various methods have been used in the past for cutting ultra-hard materials. Examples of such methods are spark erosion, and laser cutting. Laser cutting has traditionally used rod lasers which have the disadvantage that damage to the ultra-hard material generally occurs. This damaged material has to be subsequently removed. This removal adds to the expense of producing a product from the ultra-hard material and is wasteful of the material itself.

SUMMARY OF THE INVENTION

According to the present invention, a method of cutting an ultra-hard material includes the steps of using a slab laser beam to effect the cut. By "ultra-hard material" as used herein and in the claims is meant a particle which has a hardness of about 10 or more on the MOHS hardness scale, or a material which contains such particles and has a similar hardness. Particular examples of such materials are natural or synthetic diamond and cubic boron nitride polycrystalline diamond (PCD) and polycrystalline cubic boron nitride (PCBN).

DESCRIPTION OF EMBODIMENTS

The invention uses a slab laser. A slab laser may comprise a slab of material having parallel, elongate faces and end faces which are each cut to define a brewster angle. The laser beam enters and exists across the brewster angle end faces and undergoes total internal reflections on the two parallel, elongate faces. This reduces the thermal distortion and lensing effect leading to reduced beam divergence. Restricting the laser to oscillate in $TEM_{00}$ mode only further reduces the beam divergence. This results in a 'sharper' more parallel beam with greater depth of focus which is beneficial to precision laser cutting of ultra-hard materials. In addition, the greatly reduced beam divergence means that a smaller spot size (focussed spot) is possible.

It has been found that the use of a slab laser improves cutting efficiency and reduces damage to the ultra-hard material. Thus, a higher yield of smaller products or pieces from the material is possible than when using a rod laser. A slab laser further allows for better heat distribution and lower power use.

The use of a slab laser has application in any ultra-hard material, particularly a backed or an unbacked PCD or PCBN. A backed PCD or PCBN comprises a layer of PCD or PCBN bonded to a substrate or support which is generally a cemented carbide. The cemented carbide may be any known in the art such as cemented tungsten carbide, cemented titanium carbide or cemented tantalum carbide.

In use, the slab laser may be used to produce a cut completely through the ultra-hard material producing two or more separate pieces. Alternatively, the cut may be only partially through the material, from one or both sides.

The invention has particular application to the cutting of backed or unbacked PCD or PCBN. It has been found that the slab laser on cutting through the PCD or PCBN allows for weak graphite or hexagonal boron nitride bonds, as the case may be, to be formed leaving a weakly bonded structure. With carbide backed PCD or PCBN, weak carbide bonds are also formed in the carbide backing. Further damage to the PCD, PCBN and carbide backing is less with slab laser cutting when compared with rod laser cutting.

In an example of the invention, a carbide backed PCD product sold under the trade mark Syndite® was cut both by a rod laser and by a slab laser. The conditions used are set out in Table I:

TABLE 1

| YAG TYPE | ROD | SLAB |
| --- | --- | --- |
| Beam divergence (mrad) | 2.0 | 0.34 |
| Mode | Multimode | $TEM_{00}$ |
| Pulse width (ms) | 0.5 | 0.26 |
| Pulse energy (J) | 1.53 | 0.48 |
| Average power (W) | 75 | 20.02 |
| Peak power (kW) | 3.06 | 1.85 |
| Repetition rate (Hz) | 49 | 41.7 |
| Cutting speed (mm/min) | 45–50 | 10 |
| Focal length of lens (mm) | 80 | 100 |
| Beam expanding telescope ratio | x3 | X2 |
| Focussed spot size ($\mu$m) | 70 (minimum) | 70 (20 minimum) |
| Assist gas | Air | $O_2$ |

The laser damage created by both forms of cutting was compared and the results thereof are set out in Table II:

TABLE II

| | ROD | SLAB |
| --- | --- | --- |
| Depth of carbide damage ($\mu$m) | >100 | 50 |
| Depth of PCD damage ($\mu$m) | <50 | <50 |
| PCD cracking? | Yes | No |
| Width of damage to polished PCD surface along cut edge ($\mu$m) | 60 | 30 |

The difference in damage between slab and rod laser cut Syndite® pieces can be assessed in other ways. First, the destructive or permanent damage when using a rod laser results in the PCD layer being very susceptible to cracking. Cracking can render the cut piece commercially useless. The type of cracking created by rod laser is almost certainly caused by thermal stress which puts the surface of the PCD in tension on cooling. In contrast, slab laser cutting uses a much lower level of power which results in reduced thermal stress and no observable cracking in the cut pieces. Second, another type of damage is surface and sub-surface damage, i.e. damage which can be removed but reduces cutting yield and increases the cost of tool fabrication. With rod and slab laser cutting, there is a clear difference in the carbide substrate after a 0.05 mm edge grind. In the pieces cut using a slab laser, the carbide substrate is clear and free of damage. In contrast, pieces cut using a rod laser exhibit a "crocodile skin" effect in the carbide substrate. A "crocodile skin" effect is a heat phase cracking and is a hard brittle skin on the carbide that has to be removed before the piece can be used to fabricate a tool. It is estimated that using a rod laser the effect extends back 0.1 to 0.15 mm from the cutting edge. With a slab laser, the effect, if at all, extends back less than 0.05 mm.

The use of a slab laser beam also has several advantages over conventional wire EDM cutting of backed and unbacked polycrystalline products. For example, there is less damage to the polycrystalline products and support or substrate, there is a significant increase in the cut product, the necessity for post-cutting treatment to restore edge quality is reduced, there is less leaching of metal from the support and less edge undercutting.

What is claimed is:

1. A method of cutting an ultra-hard material, the method comprising using a slab laser beam to effect a cut of the ultra-hard material.

2. The method according to claim 1, wherein the ultra-hard material is PCD or PCBN.

3. The method according to claim 2, wherein the ultra-hard material is bonded to a substrate.

4. The method according to claim 3, wherein the substrate is a cemented carbide substrate.

5. The method according to claim 4, wherein a depth of damage to the cemented carbide substrate caused by the cut is less than 50 $\mu$m.

6. The method according to claim 3, wherein a depth of damage to the substrate caused by the cut is less than 50 $\mu$m.

7. A method according to claim 1, wherein the slab laser is operated in $TEM_{00}$ mode.

8. The method according to claim 2, wherein the slab laser is operated in $TEM_{00}$ mode.

9. The method according to claim 3, wherein the slab laser is operated in $TEM_{00}$ mode.

10. The method according to claim 4, wherein the slab laser is operated in $TEM_{00}$ mode.

11. The method according to claim 5, wherein the slab laser is operated in $TEM_{00}$ mode.

* * * * *